US012384246B2

(12) United States Patent
Hair et al.

(10) Patent No.: US 12,384,246 B2
(45) Date of Patent: Aug. 12, 2025

(54) LOW-SPEED VEHICLE CONTROL

(71) Applicant: Ford Global Technologies, LLC, Dearborn, MI (US)

(72) Inventors: Jonathan Hair, Northville, MI (US); Brendan Francis Diamond, Grosse Pointe, MI (US); Keith Weston, Canton, MI (US); Victor Martinez, Novi, MI (US); Lorne Forsythe, Novi, MI (US); Andrew Denis Lewandowski, Sterling Heights, MI (US); Jordan Barrett, Milford, MI (US); Alexander Ferencz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 18/187,840

(22) Filed: Mar. 22, 2023

(65) Prior Publication Data

US 2024/0317223 A1    Sep. 26, 2024

(51) Int. Cl.
*B60W 10/18* (2012.01)
*B60K 35/00* (2024.01)
(Continued)

(52) U.S. Cl.
CPC ........... *B60W 30/143* (2013.01); *B60K 35/00* (2013.01); *B60W 10/18* (2013.01); *B60K 35/10* (2024.01);
(Continued)

(58) Field of Classification Search
CPC ...... B60K 35/10; B60K 35/65; B60K 35/654; B60K 2360/126; B60K 2360/1438; B60K 2360/741; B60K 6/365; B60K 6/386; B60K 6/445; B60K 6/543; B60K 2006/381; B60W 10/06; B60W 10/08; B60W 10/115;
(Continued)

(56) References Cited

U.S. PATENT DOCUMENTS 6,385,527 B1    5/2002   Zumberge et al.
7,117,077 B2   10/2006   Michi et al.
(Continued)

FOREIGN PATENT DOCUMENTS

CN    109070918 A    12/2018
CN    112297861 B     7/2022
(Continued)

*Primary Examiner* — Hai H Huynh
*Assistant Examiner* — Johnny H Hoang
(74) *Attorney, Agent, or Firm* — Frank A. MacKenzie; Brooks Kushman P.C.

(57) ABSTRACT

A computer includes a processor and a memory, and the memory stores instructions executable by the processor to, in response to one of a vehicle feature of a vehicle being active or the vehicle being in a preset geographic area, control acceleration and braking of the vehicle based on input from an input device of the vehicle according to a low-speed mode; and in response to the low-speed mode being inactive, control acceleration and braking of the vehicle not according to the low-speed mode. In the low-speed mode, acceleration occurs upon receiving input from the input device. In the low-speed mode, braking occurs upon not receiving input from the input device.

20 Claims, 4 Drawing Sheets

(51) Int. Cl.
*B60W 30/14* (2006.01)
*B60K 35/10* (2024.01)

(52) U.S. Cl.
CPC ..... *B60W 2540/10* (2013.01); *B60W 2552/00* (2020.02)

(58) Field of Classification Search
CPC ........... B60W 10/18036; B60W 20/20; B60W 20/30; B60W 30/18036; F16H 3/727; F16H 2200/201; F16H 2200/2038; F16H 2200/2097; F16H 2200/0082; Y02T 10/62
USPC ........................ 701/45–50, 65, 80–82, 70, 79
See application file for complete search history.

(56) References Cited

U.S. PATENT DOCUMENTS

| | | | |
|---|---|---|---|
| 8,214,124 B2 | 7/2012 | Kumabe et al. | |
| 9,187,067 B2 | 11/2015 | Breu | |
| 10,137,872 B2 | 11/2018 | Goto | |
| 11,603,092 B2 * | 3/2023 | Ding | B60W 30/143 |
| 2006/0229771 A1 | 10/2006 | Messner et al. | |
| 2018/0141556 A1 | 5/2018 | Goh | |
| 2018/0154876 A1 | 6/2018 | Kim | |
| 2019/0161082 A1 * | 5/2019 | Fairgrieve | B60W 30/143 |
| 2020/0130452 A1 * | 4/2020 | Rothwell | B60T 8/175 |
| 2020/0298855 A1 * | 9/2020 | Demerly | B60W 30/143 |
| 2020/0317194 A1 * | 10/2020 | Yan | B60W 30/12 |
| 2021/0101596 A1 | 4/2021 | Yan et al. | |
| 2021/0403033 A1 * | 12/2021 | Cohen | B60W 60/0013 |
| 2022/0032929 A1 * | 2/2022 | Wang | B60W 60/0015 |
| 2022/0332312 A1 * | 10/2022 | Lee | B60W 30/16 |
| 2023/0021615 A1 * | 1/2023 | Inaba | F16D 61/00 |

FOREIGN PATENT DOCUMENTS

| | | |
|---|---|---|
| EP | 1695859 A1 | 8/2006 |
| EP | 1702786 A1 | 9/2006 |
| EP | 3858696 A1 | 8/2021 |
| WO | 2018085324 A1 | 5/2018 |
| WO | 2021139710 A1 | 7/2021 |

* cited by examiner

LOW-SPEED VEHICLE CONTROL

BACKGROUND

Some electric vehicles are equipped with one-pedal drive. When the one-pedal drive is disengaged (or when a vehicle is not equipped with one-pedal drive), the vehicle will drive at a slow speed when no pressure is applied to the accelerator pedal or to the brake pedal. This is called creep torque. When an operator engages one-pedal drive, the vehicle will accelerate when pressure is applied to the accelerator pedal, and the vehicle will brake when no pressure is applied to the accelerator pedal, even if no pressure is applied to the brake pedal. In other words, the vehicle does not use creep torque when one-pedal drive is engaged.

DETAILED DESCRIPTION

This disclosure describes techniques for controlling a vehicle using a low-speed mode. A computer of the vehicle is programmed to, under certain conditions, control acceleration and braking of the vehicle based on input from an input device of the vehicle according to the low-speed mode. In the low-speed mode, acceleration occurs upon receiving input from the input device, and braking occurs upon not receiving input from the input device. If the low-speed mode is inactive, the computer controls acceleration and braking of the vehicle not according to the low-speed mode, e.g., according to a two-pedal-drive mode in which creep torque is exhibited. The input device may be an accelerator pedal of the vehicle or may be an alternative input device such as a knob, button, or paddle. The conditions being satisfied may prompt activation of the low-speed mode, i.e., accepting inputs from the accelerator pedal according to the low-speed mode. Alternatively or additionally, when the low-speed mode is already active, the conditions being satisfied may prompt acceptance of inputs from one or more of the alternative input devices.

The conditions include one of a vehicle feature of the vehicle being active or the vehicle being in a preset geographic area. Examples of vehicle features include adaptive cruise control and automatic vehicle hold. The preset geographic area may be, e.g., a parking lot or other environment in which low-speed movement of the vehicle is expected. Use of these conditions may provide a smoother transition for the operator to providing input for the low-speed mode. For example, if the low-speed mode is activated in response to the adaptive cruise control being active while the vehicle is stopped (e.g., as occurs in stop-and-go traffic), the operator may be able to move the vehicle closer to a leading vehicle without needing to quickly press the accelerator pedal and then the brake pedal. Instead, braking occurs upon release of the accelerator pedal. For another example, if the use of an alternative input device is activated to control the vehicle in the low-speed mode while the vehicle is in a parking lot, the operator may be able to quickly transition from using the accelerator pedal to using the alternative input device in order to more finely control the position of the vehicle when parking.

A computer includes a processor and a memory, and the memory stores instructions executable by the processor to, in response to one of a vehicle feature of a vehicle being active or the vehicle being in a preset geographic area, control acceleration and braking of the vehicle based on input from an input device of the vehicle according to a low-speed mode; and in response to the low-speed mode being inactive, control acceleration and braking of the vehicle not according to the low-speed mode. In the low-speed mode, acceleration occurs upon receiving input from the input device. In the low-speed mode, braking occurs upon not receiving input from the input device.

In an example, the instructions may further include instructions to, in response to (1) a speed at which the vehicle is traveling being below a threshold and (2) one of the vehicle feature being active or the vehicle being in the preset geographic area, control acceleration and braking of the vehicle based on input from the input device according to the low-speed mode.

In an example, the input device may include an accelerator pedal. In a further example, the instructions may further include instructions to, in response to the accelerator pedal being pressed by at least a preset amount, deactivate the low-speed mode.

In an example, the instructions may further include instructions to, in response to the vehicle feature being active, control acceleration and braking of the vehicle based on input from the input device according to the low-speed mode. In a further example, the vehicle feature may include adaptive cruise control.

In another further example, the vehicle feature may include automatic vehicle hold, and the instructions may further include instructions to, in response to the automatic vehicle hold being active, brake the vehicle in response to a brake pedal of the vehicle being released while the vehicle is stopped.

In an example, the instructions may further include instructions to, in response to the vehicle being in the preset geographic area, control acceleration and braking of the vehicle based on input from the input device according to the low-speed mode. In a further example, the preset geographic area may include areas designated in map data as parking areas.

In another further example, the preset geographic area may include a user-inputted geographic area.

In another further example, the instructions may further include instructions to, in response to the vehicle being in the preset geographic area, control acceleration and braking of the vehicle to prevent the vehicle from exceeding a preset speed.

In an example, the instructions may further include instructions to, in response to the low-speed mode being active and the vehicle being in the preset geographic area, control acceleration and braking of the vehicle based on input from the input device according to the low-speed mode. In a further example, the input device may include an alternative input device other than an accelerator pedal.

In an example, the input device may include an alternative input device other than an accelerator pedal. In a further example, the alternative input device may include a knob.

In another further example, the alternative input device may include a button.

In another further example, the alternative input device may include a paddle.

In another further example, the instructions may further include instructions to control acceleration and braking of the vehicle to travel a distance and then stop, the distance being a function of an input from the alternative input device.

In another further example, an input from the alternative input device may include a direction of the input, and the instructions may further include instructions to control acceleration and braking of the vehicle to travel forward in response to the direction of the input being a first direction and to travel in reverse in response to the direction of the input being a second direction.

A method includes, in response to one of a vehicle feature of a vehicle being active or the vehicle being in a preset geographic area, controlling acceleration and braking of the vehicle based on input from an input device of the vehicle according to a low-speed mode; and in response to the low-speed mode being inactive, controlling acceleration and braking of the vehicle not according to the low-speed mode. In the low-speed mode, acceleration occurs upon receiving input from the input device. In the low-speed mode, braking occurs upon not receiving input from the input device.

With reference to the Figures, wherein like numerals indicate like parts throughout the several views, a computer 105 includes a processor and a memory, and the memory stores instructions executable by the processor to, in response to one of a vehicle feature of a vehicle 100 being active or the vehicle 100 being in a preset geographic area 305, control acceleration and braking of the vehicle 100 based on input from an input device 110 of the vehicle 100 according to a low-speed mode 205, 210; and in response to the low-speed mode 205, 210 being inactive, control acceleration and braking of the vehicle 100 not according to the low-speed mode 205, 210. In the low-speed mode 205, 210, acceleration occurs upon receiving input from the input device 110. In the low-speed mode 205, 210, braking occurs upon not receiving input from the input device 110.

Figure 1:
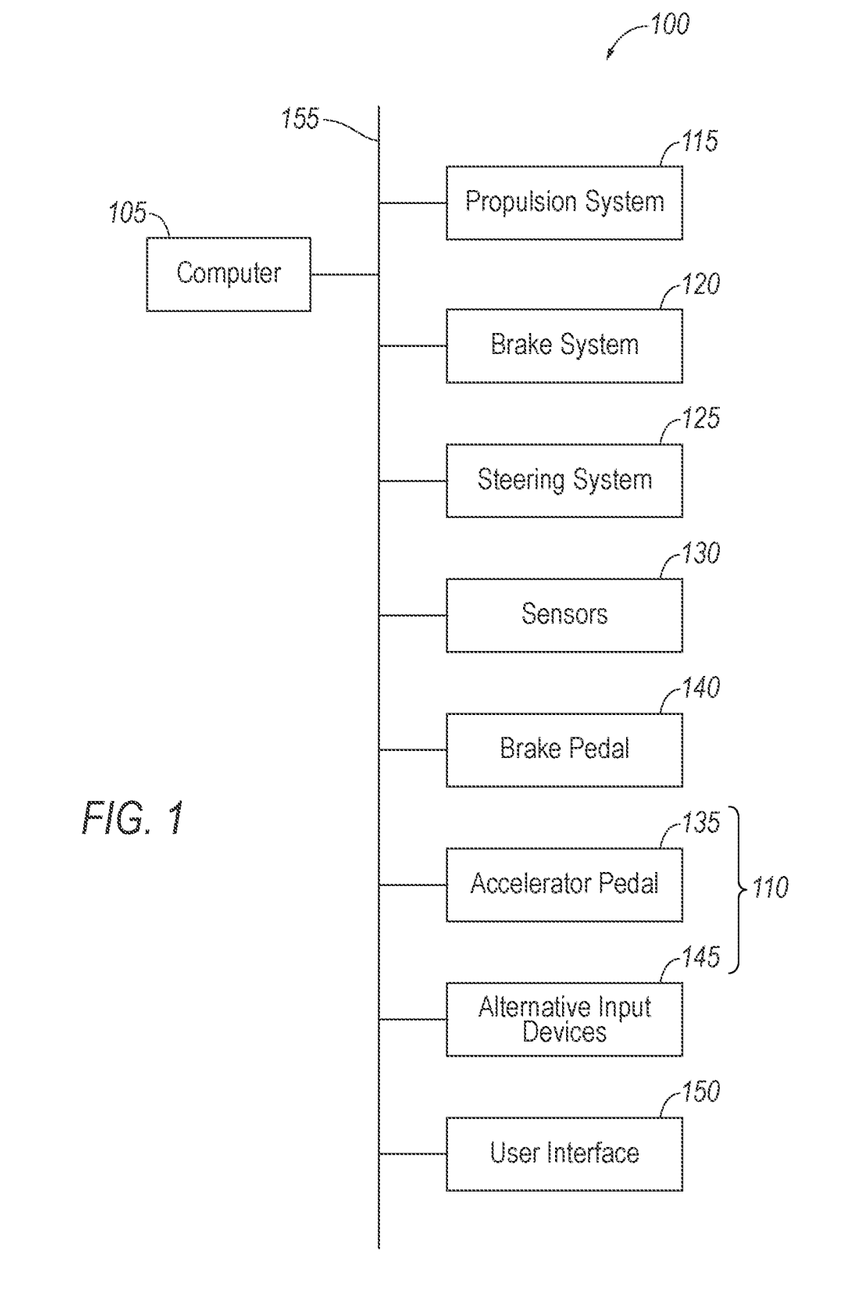
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 155 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to a propulsion system 115, a brake system 120, a steering system 125, sensors 130, an accelerator pedal 135, a brake pedal 140, alternative input devices 145, a user interface 150, and other components via the communications network 155.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., the accelerator pedal 135 and/or a gear-shift lever, as well as with the alternative input devices 145 as described below.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., the brake pedal 140, as well as with the alternative input devices 145 as described below.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel 425.

The sensors 130 may provide data about operation of the vehicle 100, for example, vehicle speed, wheel speed, wheel orientation, and engine and transmission data (e.g., temperature, fuel consumption, etc.). The sensors 130 may detect the location and/or orientation of the vehicle 100. For example, the sensors 130 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 130 may detect the external world, e.g., objects and/or characteristics of surroundings of the vehicle 100, such as other vehicles, road lane markings, traffic lights and/or signs, pedestrians, etc. For example, the sensors 130 may include radar sensors, ultrasonic sensors, scanning laser range finders, light detection and ranging (lidar) devices, and image processing sensors such as cameras.

The accelerator pedal 135 provides input to the computer 105 indicating a position of the accelerator pedal 135 for use in controlling the propulsion system 115 and/or the brake system 120. The accelerator pedal 135 is positioned to be pressable by an operator of the vehicle 100. The accelerator pedal 135 is movable relative to the body of the vehicle 100, e.g., is coupled by a hinge to the body of the vehicle 100. The accelerator has a range of motion, e.g., an angular range of motion around the hinge. The position of the accelerator pedal 135 within the range of motion is reported to the computer 105.

The brake pedal 140 provides input to the computer 105 indicating a position of the brake pedal 140 for use in controlling the brake system 120. The brake pedal 140 is positioned to be pressable by an operator of the vehicle 100. The brake pedal 140 is movable relative to the body of the vehicle 100, e.g., is coupled by a hinge to the body of the vehicle 100. The brake has a range of motion, e.g., an angular range of motion around the hinge. The position of the brake pedal 140 within the range of motion is reported to the computer 105.

The input device 110 may include the accelerator pedal 135 and one or more alternative input devices 145. An alternative input device 145 is a component other than the accelerator pedal 135 that is manipulable by an operator of the vehicle 100 for controlling the propulsion system 115 under at least some circumstances. The alternative input devices 145 provide input to the computer 105 for use in controlling the propulsion system 115 and the brake system 120 when the vehicle 100 is in a specific mode, as described below with respect to FIG. 2. Examples of the alternative input devices 145 are described below with respect to FIG. 4.

Figure 4:
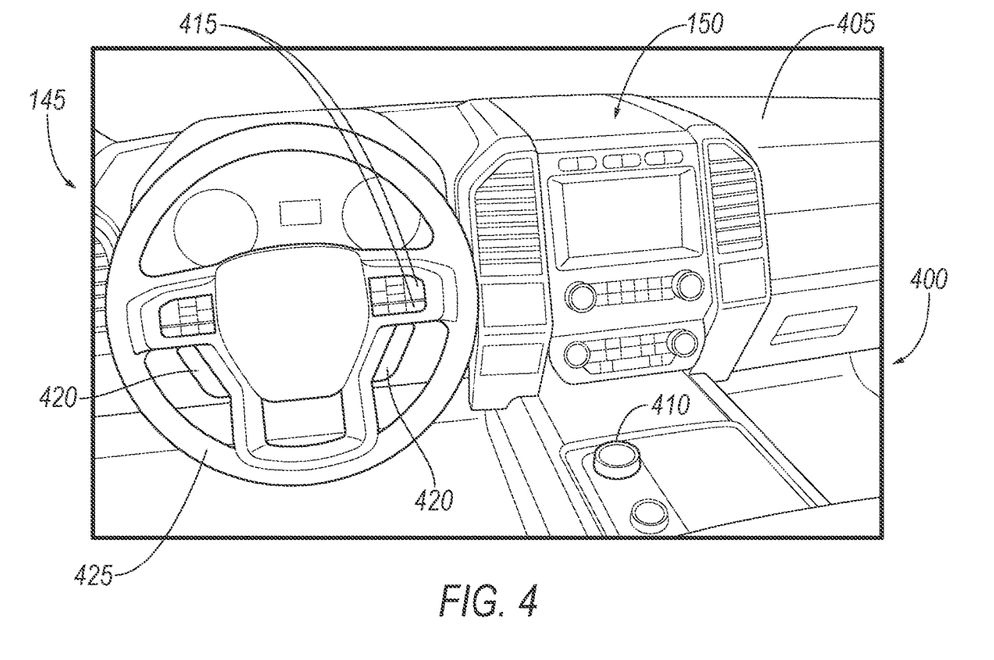
FIG. 4 is a plan view of an example instrument panel of the vehicle.

The user interface 150 presents information to and receives information from an occupant of the vehicle 100. The user interface 150 may be located, e.g., on an instrument panel 405 in a passenger cabin 400 of the vehicle 100, or wherever may be readily seen by the occupant. The user interface 150 may include dials, digital readouts, screens, speakers, and so on for providing information to the occupant, e.g., human-machine interface (HMI) elements such as are known. The user interface 150 may include buttons, knobs, keypads, microphone, and so on for receiving information from the occupant. The user interface 150 may include the alternative input devices 145.

The vehicle 100 may have a plurality of vehicle features. For the purposes of this disclosure, a "vehicle feature" is defined as an activatable functionality or set of functionalities of the vehicle 100. For example, the vehicle features may be advanced driver assistance systems (ADAS). The vehicle features may affect the operation of the acceleration and/or braking of the vehicle 100, i.e., the propulsion system 115 and/or the brake system 120. For example, the vehicle features may include adaptive cruise control, automatic vehicle hold, etc.

The vehicle features may include adaptive cruise control. When adaptive cruise control is engaged, the computer 105 accelerates the vehicle 100 to maintain the vehicle speed at an operator-selected speed when data from the sensors 130 indicate no objects within a threshold distance in front of the vehicle 100, and the computer 105 brakes the vehicle 100 and/or reduces acceleration to maintain at least the threshold distance with a nearest object detected by the sensors 130 in front of the vehicle 100.

The vehicle 100 feature may include automatic vehicle hold. In response to the automatic vehicle hold being active, the computer 105 brakes the vehicle 100 in response to a brake pedal 140 of the vehicle 100 being released while the vehicle 100 is stopped. In other words, when the vehicle 100 is stopped, the vehicle 100 remains stopped until the computer 105 receives an input to accelerate. Thus, the vehicle 100 does not exhibit creep torque when stopped.

Figure 2:
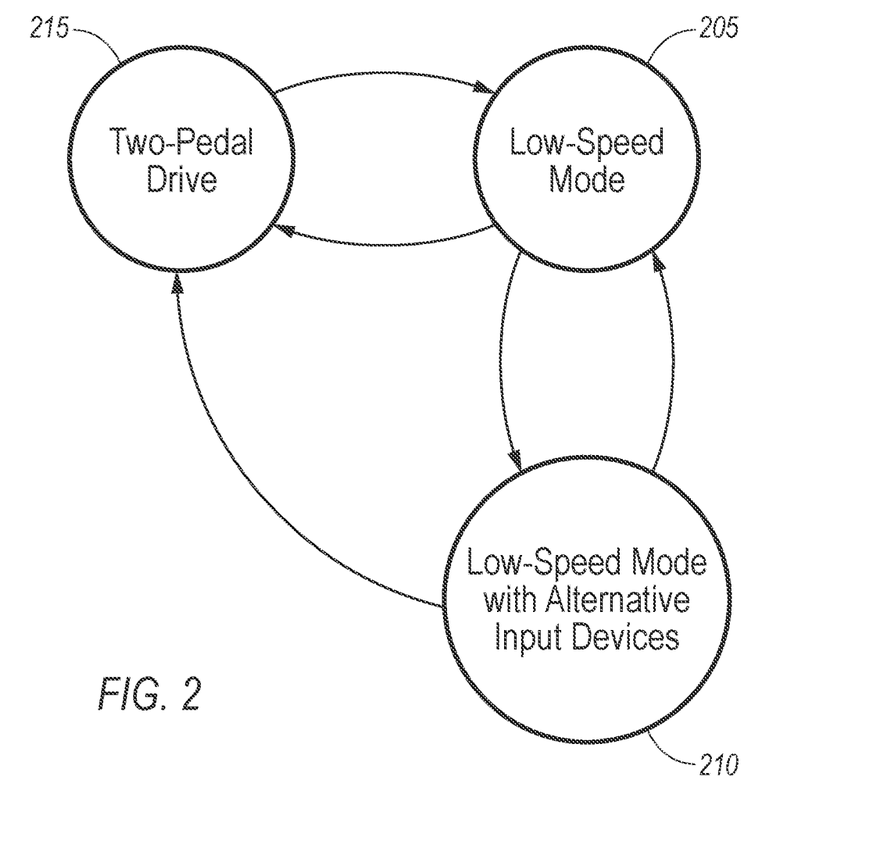
FIG. 2 is a network graph of example modes of the vehicle.

With reference to FIG. 2, when the vehicle 100 is in the low-speed mode 205, 210, the computer 105 is programmed to control acceleration and braking of the vehicle 100 based on input from the input devices 110 of the vehicle 100 according to the low-speed mode 205, 210. In the low-speed mode 205, 210, acceleration occurs upon receiving input from one of the input devices 110. In other words, the computer 105 actuates the propulsion system 115 to accelerate the vehicle 100 upon receiving input from one of the input devices 110. The acceleration may be capped at a maximum torque or maximum speed. The maximum torque or maximum speed may be chosen to keep the vehicle 100 within speeds appropriate for parking or similar maneuvers. In the low-speed mode 205, 210, braking occurs upon not receiving input from the input device 110, e.g., from the accelerator pedal 135 or from any of the alternative input devices 145. In other words, the computer 105 actuates the brake system 120 to slow or stop the vehicle 100 upon not receiving input from any of the input devices 110 that are currently designated to provide input controlling acceleration, even if the brake pedal 140 is not being pressed. The braking force applied by the brake system 120 may depend on circumstances such as how the low-speed mode 205, 210 was engaged. For example, the braking force may be applied by regenerative brakes of the brake system 120 and may slow the vehicle 100 more gradually (sometimes called one-pedal drive), or the braking force may be applied by the disc brakes of the brake system 120 at a typical braking force used when the brake pedal 140 is engaged. In the low-speed mode 205, 210, braking also occurs upon receiving an input from the brake pedal 140, in the same manner as occurs in a two-pedal-drive mode 215.

The low-speed mode 205, 210 may include a first low-speed mode 205 and a second low-speed mode 210. In the first low-speed mode 205, the accelerator pedal 135 is designated to provide input controlling acceleration, and the alternative input devices 145 are not designated to provide input controlling acceleration. In other words, in the first low-speed mode 205, the computer 105 is programmed to control acceleration based on input from the accelerator pedal 135 and ignore inputs from the alternative input devices 145. In the first low-speed mode 205, braking occurs upon not receiving input from the accelerator pedal 135, regardless of input from the alternative input devices 145. In the second low-speed mode 210, the accelerator pedal 135 and the alternative input devices 145 are designated to provide input controlling acceleration. In other words, in the second low-speed mode 210, the computer 105 is programmed to control acceleration based on input from any of the input devices 110. In the second low-speed mode 210, braking occurs upon not receiving input from any of the input devices 110, i.e., from the accelerator pedal 135 or any of the alternative input devices 145.

The computer 105 is programmed to, in response to the low-speed mode 205, 210 being inactive, control acceleration and braking of the vehicle 100 not according to the low-speed mode 205, 210. For example, the vehicle 100 may be in the two-pedal-drive mode 215. In the two-pedal-drive mode 215, acceleration occurs upon receiving input from the accelerator pedal 135, and braking occurs upon receiving input from the brake pedal 140. If neither the accelerator pedal 135 nor the brake pedal 140 are providing input (i.e., are pressed by the operator), then friction will slow the vehicle 100, and the vehicle 100 will exhibit creep torque at low speeds.

The computer 105 is programmed to switch the vehicle 100 between the modes 205, 210, 215 under various conditions, as will be described below. The computer 105 may switch from the two-pedal-drive mode 215 to the low-speed mode 205, 210, specifically the first low-speed mode 205. The computer 105 may switch from the low-speed mode 205, 210, either the first low-speed mode 205 or the second low-speed mode 210, to the two-pedal-drive mode 215. The computer 105 may be able to switch from the first low-speed mode 205 to the second low-speed mode 210 but not from the two-pedal-drive mode 215 to the second low-speed mode 210. In other words, the second low-speed mode 210 may only be entered from the first low-speed mode 205.

The computer 105 is programmed to switch the vehicle 100 from the two-pedal-drive mode 215 to the low-speed mode 205, 210, specifically the first low-speed mode 205, in response to one or a combination of (1) a speed at which the vehicle 100 is traveling (i.e., the vehicle speed) being below a threshold, (2) one of the vehicle features being active, and (3) receiving an input from an operator indicating to switch the vehicle 100 to the first low-speed mode 205. For example, the computer 105 may switch the vehicle 100 from the two-pedal-drive mode 215 to the first low-speed mode 205 in response to both (1) the vehicle speed being below the threshold and (2) one of the vehicle features being active. For another example, the computer 105 may switch the vehicle 100 from the two-pedal-drive mode 215 to the first low-speed mode 205 in response to receiving the input from the operator indicating to switch the vehicle 100 to the first low-speed mode 205.

The condition for switching the vehicle 100 to the first low-speed mode 205 may include the vehicle speed being below the threshold. The computer 105 may receive the vehicle speed from the sensors 130 over the communications network 155. The threshold may be a preset value stored in the memory of the computer 105. The threshold may be chosen to be a typical speed used for parking the vehicle 100, e.g., 2 miles per hour.

The condition for switching the vehicle 100 to the first low-speed mode 205 may include one of the vehicle features being active. For example, the condition may include that one of adaptive cruise control or automatic vehicle hold are active.

The condition for switching the vehicle 100 to the first low-speed mode 205 may include receiving the input from the operator indicating to switch the vehicle 100 to the first low-speed mode 205. For example, the operator may provide the input via the user interface 150, e.g., using a button or touchscreen.

One or more characteristics of the first low-speed mode 205 may be dependent on the manner of switching to the first low-speed mode 205. For example, the braking force may be dependent on the manner of switching. When the first low-speed mode 205 was activated by the vehicle feature being active, the computer 105 may use the disc brakes when actuating the brake system 120. When the first low-speed mode 205 was activated by the input from the operator, the computer 105 may use the regenerative brakes when actuating the brake system 120 as a result of a lack of input from the input device 110 and may use the disc brakes when actuating the brake system 120 as a result of an input from the brake pedal 140.

The computer 105 may be programmed to deactivate the low-speed mode 205, 210, e.g., switch the vehicle 100 from either the first low-speed mode 205 or the second low-speed mode 210 to the two-pedal-drive mode 215, in response to one of (1) the accelerator pedal 135 being pressed by at least a preset amount or (2) receiving an input from an operator indicating to deactivate the low-speed mode 205, 210.

The condition for deactivating the low-speed mode 205, 210 may include the accelerator pedal 135 being pressed by at least a preset amount. The computer 105 may receive the position of the accelerator pedal 135 via the communications network 155. The computer 105 may compare the position of the accelerator pedal 135 within the range of motion with the position of the preset amount within the range of motion. The preset amount may be chosen to indicate a desired speed greater than a typical speed used for parking, e.g., 10 miles per hour.

The condition for deactivating the low-speed mode 205, 210, e.g., switching the vehicle 100 from the first low-speed mode 205 or second low-speed mode 210 to the two-pedal-drive mode 215, may include receiving the input from the operator indicating to deactivate the low-speed mode 205, 210. For example, the operator may provide the input via the user interface 150, e.g., using a button or touchscreen.

Figure 3:
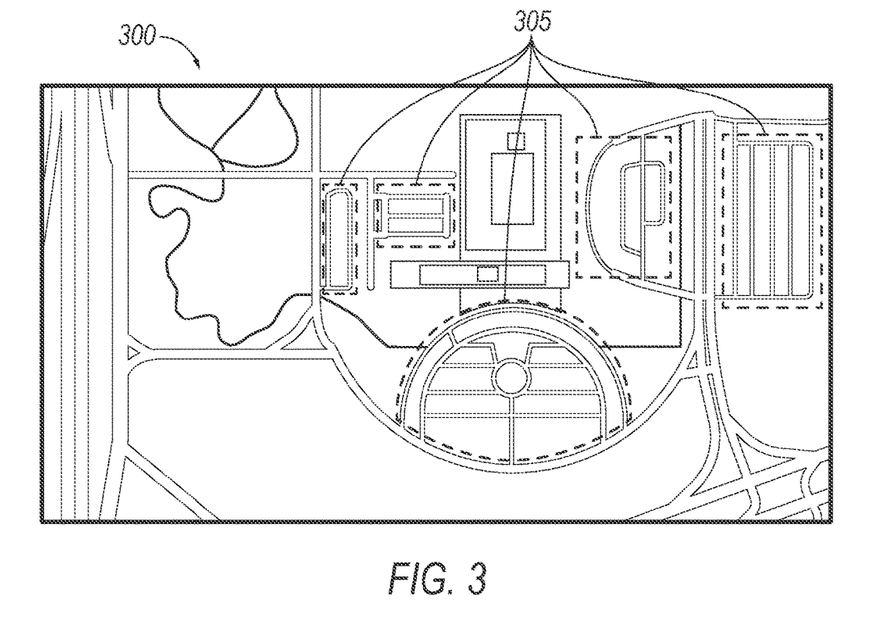
FIG. 3 is a diagram of an example preset geographic area.

The computer 105 may be programmed to switch the vehicle 100 to the second low-speed mode 210, i.e., control acceleration and braking of the vehicle 100 based on input from the alternative input devices 145, in response to one or a combination of (1) the first low-speed mode 205 being active, (2) the vehicle 100 being in a preset geographic area 305, (3) receiving an input from an operator indicating to switch the vehicle 100 to the second low-speed mode 210, and (4) the vehicle speed being below a threshold. For example, the computer 105 may switch the vehicle 100 to the second low-speed mode 210 in response to (1) the first low-speed mode 205 being active and (2) the vehicle 100 being in the preset geographic area 305. For another example, the computer 105 may switch the vehicle 100 to the second low-speed mode 210 in response to (1) the first low-speed mode 205 being active and (2) receiving an input from an operator indicating to switch the vehicle 100 to the second low-speed mode 210. For another example, the computer 105 may switch the vehicle 100 to the second low-speed mode 210 in response to the vehicle speed being below the threshold.

The condition for switching the vehicle 100 to the second low-speed mode 210 may include the first low-speed mode 205 being active.

With reference to FIG. 3, the condition for switching the vehicle 100 to the second low-speed mode 210 may include the vehicle 100 being in the preset geographic area 305. The preset geographic area 305 may be a geofenced area, i.e., a geographical area enclosed by preset virtual boundaries. The preset geographic area 305 may be stored in map data 300 in the memory of the computer 105. The computer 105 may receive a location of the vehicle 100 from a GPS sensor of the sensors 130 and compare the location with the map data 300 indicating the preset geographic area 305 to determine whether the vehicle 100 is inside or outside the preset geographic area 305.

The preset geographic area 305 may include areas designated with a specific categorization in map data 300. For example, the preset geographic area 305 may include areas designated as parking areas, e.g., parking lots, parking garages, etc. The preset geographic area 305 may be limited to areas designated as parking areas or may include, e.g., all nonroad areas, thereby including parking areas. The preset geographic area 305 may be chosen to correspond to areas in which low-speed travel is likely.

The preset geographic area 305 may include a user-inputted geographic area. An operator of the vehicle 100 may provide inputs selecting the preset geographic area 305, e.g., by selecting landmarks or locations in the map data 300, via the user interface 150. The operator may be able to select geographic areas at which the operator knows that the vehicle 100 will be traveling at low speeds.

The condition for switching the vehicle 100 to the second low-speed mode 210 may include receiving the input from the operator indicating to switch the vehicle 100 to the second low-speed mode 210. For example, the operator may provide the input via the user interface 150, e.g., using a button or touchscreen.

The condition for switching the vehicle 100 to the second low-speed mode 210 may include the vehicle speed being below the threshold. The computer 105 may receive the vehicle speed from the sensors 130 over the communications network 155. The threshold may be a preset value stored in the memory of the computer 105. The threshold may be the same or different than the threshold for switching from the two-pedal-drive mode 215 to the first low-speed mode 205. The threshold may be chosen to be a typical speed used for parking the vehicle 100, e.g., 2 miles per hour.

With reference to FIG. 4, the input devices 110 may include one or more alternative input devices 145 other than the accelerator pedal 135. For example, the alternative input devices 145 may include a knob 410, at least one button 415, and/or at least one paddle 420.

The knob 410 may be disposed on the instrument panel 405. The knob 410 may be circular and rotatable by the operator. The knob 410 may return an angle of rotation that the operator has turned the knob 410. The knob 410 may freely rotate and may remain in a same position when released by the operator, that position being the point from which further rotation is measured. Alternatively, the knob 410 may be, e.g., spring-loaded to return to a default position when released.

The at least one button 415 may be disposed on the instrument panel 405 or on the steering wheel 425. The at least one button 415 may include, e.g., two buttons 415, e.g., an "up" button 415 and a "down" button 415. Each button 415 may be movable from an unpressed position to a pressed position by the operator pressing the button 415 and movable from the pressed position to the unpressed position by, e.g., a spring mechanism when released by the operator.

The at least one paddle 420 may be coupled to the steering wheel 425 and movable with the steering wheel 425 as the steering wheel 425 is rotated. The at least one paddle 420 may include, e.g., two paddles 420, e.g., a left paddle 420 and a right paddle 420. Each paddle 420 may be tiltable relative to the steering wheel 425 from an untilted position to a tilted position by the operator pressing the paddle 420 and movable from the tilted position to the untilted position by, e.g., a spring mechanism when released by the operator.

The input provided through the alternative input devices 145 provides instructions for actuating the propulsion system 115 and/or the brake system 120. The input may map onto torque, distance, speed of the vehicle 100, and/or direction of travel; i.e., the torque, distance, speed of the vehicle 100, or direction of travel may be a function of the input.

The input from the alternative input devices 145 may map onto a torque outputted by the propulsion system 115, i.e., $t=f(I)$, in which t is the torque outputted by the propulsion system 115 and I is the input. For example, if the alternative input device 145 is a button 415 or paddle 420, the input I may be binary, corresponding to the button 415 or paddle 420 being pressed or not pressed, so the torque t is a constant positive value when the button 415 or paddle 420 is pressed and zero when the button 415 or paddle 420 is not pressed. The constant positive value of the torque t may be chosen to correspond to low-speed driving.

The input from the alternative input devices 145 may map onto a distance traveled by the vehicle 100 before stopping, i.e., $d=f(I)$, in which d is the distance traveled by the vehicle 100 and I is the input. The computer 105 may control acceleration and braking of the vehicle 100 to travel the distance d and then stop. To travel the distance d, the computer 105 may actuate the propulsion system 115 to apply a constant, low torque until the vehicle 100 has traveled the distance d and actuate the brake system 120 to brake the vehicle 100 to a stop upon the vehicle 100 traveling the distance d. For example, if the alternative input device 145 is a knob 410, the input I may be an angle that the knob 410 is rotated, and the distance d may have positive relationship with the input I, i.e., the farther the knob 410 is rotated, the farther the vehicle 100 travels before stopping. The relationship may be linear, i.e., $d=kI$, in which k is a constant chosen to correspond to a small movement of the vehicle 100. For another example, if the alternative input device 145 is a button 415 or paddle 420, the input I may be binary, corresponding to the button 415 or paddle 420 being pressed or not pressed, so the distance d may be a preset positive value that the vehicle 100 travels before stopping upon the button 415 or paddle 420 being pressed, and the vehicle 100 may remain stationary when the button 415 or paddle 420 is not pressed. Mapping the input I onto the distance d rather than onto the torque t may provide a finer degree of control to an operator of the vehicle 100 while performing low-speed maneuvers like parking.

The input from the alternative input devices 145 may map onto a speed at which the vehicle 100 travels, i.e., $v=f(I)$, in which v is the vehicle speed and I is the input. For example, if the alternative input device 145 is a knob 410, the input I may be an angle that the knob 410 is rotated from a default position, and the speed v may have positive relationship with the input I, i.e., the farther the knob 410 is rotated, the faster the vehicle 100 travels (up to a maximum speed, as described below). The relationship may be linear, i.e., $v=kI$, in which k is a constant chosen to correspond to a gradual increase in the speed v as the input I is increased. For example, if the alternative input device 145 is a button 415 or paddle 420, the input I may be binary, corresponding to the button 415 or paddle 420 being pressed or not pressed, so the speed v is a constant positive value when the button 415 or paddle 420 is pressed and zero when the button 415 or paddle 420 is not pressed. The constant positive value of the speed v may be chosen to correspond to low-speed driving. Mapping the input I onto the speed v rather than onto the torque t may provide a finer degree of control to an operator of the vehicle 100 while performing low-speed maneuvers like parking.

In addition to one or more of these examples, the input from the alternative input devices 145 may map onto a direction of travel of the vehicle 100, i.e., traveling in forward or reverse. The input from the alternative input device 145 may include a direction of the input. For a knob 410, the direction of the input may correspond to a direction of rotation of the knob 410, i.e., clockwise or counterclockwise. For another example, the alternative input device 145 may include two buttons 415, e.g., labeled "up" and "down," or two paddles 420, e.g., a left paddle 420 and a right paddle 420. The direction may be indicated by which of the two buttons 415 or which of the two paddles 420 is pressed by the operator. The computer 105 may actuate the propulsion system 115 for the vehicle 100 to travel forward in response to the direction of input being a first direction, e.g., clockwise rotation of the knob 410, the "up" button 415, or the right paddle 420, and to travel in reverse in response to the direction of the input being a second direction, e.g., counterclockwise rotation of the knob 410, the "down" button 415, or the left paddle 420. Using the direction of input may permit the operator to more conveniently perform maneuvers that would normally require shifting between forward and reverse such as parallel parking or a three-point turn.

The computer 105 may be programmed to control acceleration and braking of the vehicle 100 to prevent the vehicle 100 from exceeding a preset speed. For example, the computer 105 may decrease a torque outputted from the propulsion system 115 from the torque that would otherwise have been outputted in response to the vehicle 100 reaching the preset speed. The preset speed may be chosen to keep the vehicle 100 within a typical range of speeds for parking or similar maneuvers, e.g., 5 miles per hour. Using the preset speed may prevent larger movements by the vehicle 100 than an operator would normally desire in low-speed situations.

Figure 5:
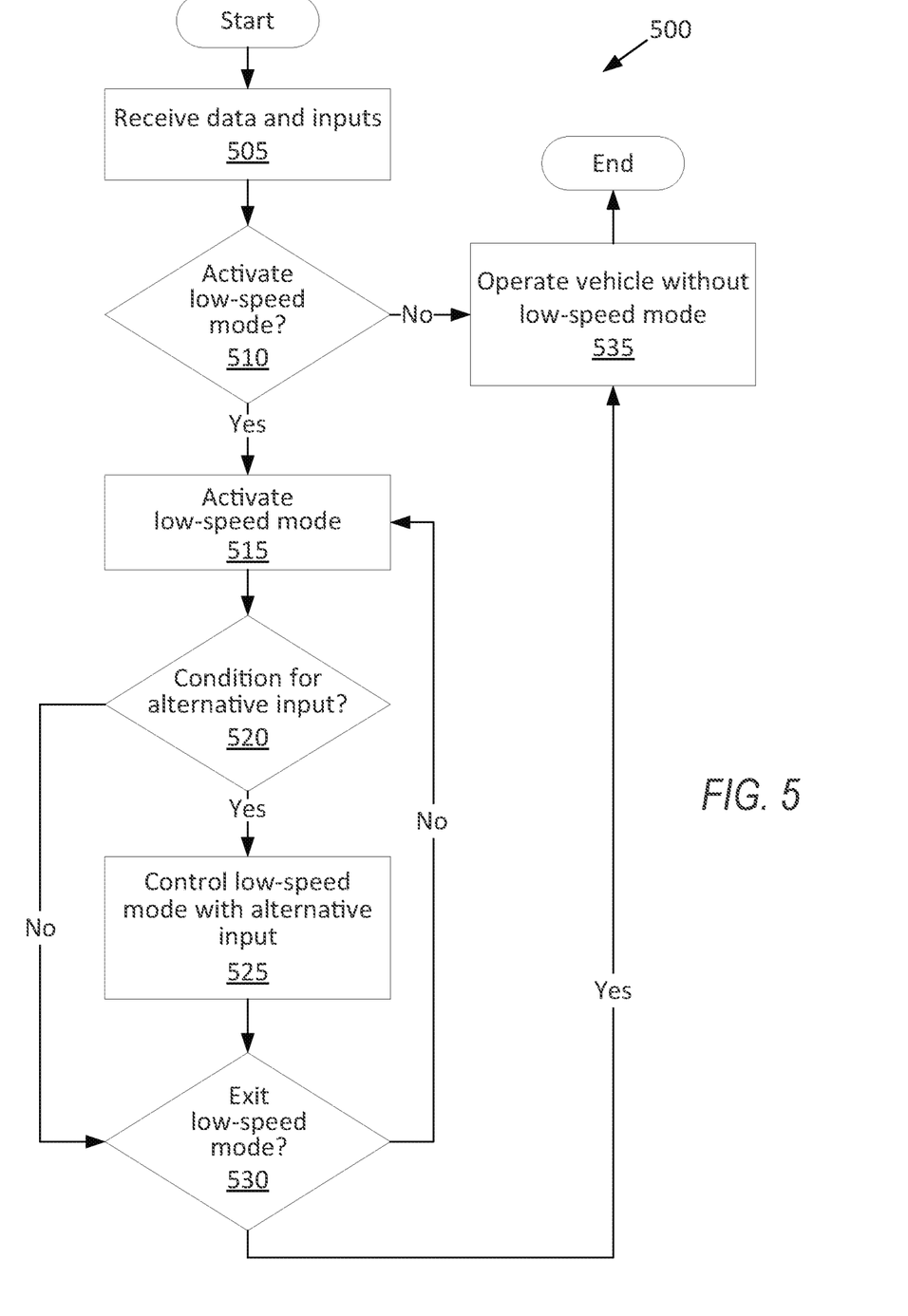
FIG. 5 is a flowchart of an example process for controlling the vehicle with a low-speed mode.

FIG. 5 is a process flow diagram illustrating an example process 500 for controlling the vehicle 100 with the low-speed modes 205, 210. The memory of the computer 105 stores executable instructions for performing the steps of the process 500 and/or programming can be implemented in structures such as mentioned above. As a general overview of the process 500, the computer 105 switches the vehicle 100 into the first low-speed mode 205 in response to one of the conditions being satisfied for switching to the first low-speed mode 205, switches the vehicle 100 from the first low-speed mode 205 to the second low-speed mode 210 in response to one of the conditions being satisfied for switching to the second low-speed mode 210, and switches the vehicle 100 to the two-pedal-drive mode 215 in response to one of the conditions being satisfied for switching to the two-pedal-drive mode 215. The computer 105 may put the vehicle 100 into the two-pedal-drive mode 215 by default and in response to the conditions for switching to the first low-speed mode 205 not being satisfied.

The process 500 begins in a block 505, in which the computer 105 receives data and inputs via the communications network 155, as described above. When the process 500 begins, the vehicle 100 is in the two-pedal-drive mode 215.

Next, in a decision block 510, the computer 105 determines whether to switch the vehicle 100 from the two-pedal-drive mode 215 to the first low-speed mode 205, as described above. In response to one of the conditions being satisfied for switching the vehicle 100 to the first low-speed mode 205, the process 500 proceeds to a block 515. In response to the conditions not being satisfied, the process 500 proceeds to a block 535.

In the block 515, the computer 105 controls acceleration and braking of the vehicle 100 based on input from the accelerator pedal 135 according to the first low-speed mode 205, as described above.

Next, in a decision block 520, the computer 105 determines whether to switch the vehicle 100 from the first low-speed mode 205 to the second low-speed mode 210, as described above. In response to one of the conditions being satisfied for switching the vehicle 100 to the second low-speed mode 210, the process 500 proceeds to a block 525. In response to the conditions not being satisfied, the process 500 proceeds to a decision block 530.

In the block 525, the computer 105 controls acceleration and braking of the vehicle 100 based on input from the alternative input devices 145 according to the second low-speed mode 210, as described above. After the block 525, the process 500 proceeds to the decision block 530.

In the decision block 530, the computer 105 determines whether to switch the vehicle 100 from the low-speed mode 205, 210 to the two-pedal-drive mode 215, as described above. In response to one of the conditions being satisfied for switching the vehicle 100 from the low-speed mode 205, 210 to the two-pedal-drive mode 215, the process 500 proceeds to the block 535. In response to the conditions not being satisfied, the process 500 returns to the block 515 to remain in the low-speed mode 205, 210.

In the block 535, the computer 105 controls acceleration and braking of the vehicle 100 according to the two-pedal-drive mode 215, as described above. After the block 535, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   in response to one of a vehicle feature of a vehicle being active or the vehicle being in a preset geographic area, control acceleration and braking of the vehicle based on input from an input device of the vehicle according to a low-speed mode; and
   in response to the low-speed mode being inactive, control acceleration and braking of the vehicle not according to the low-speed mode;
   wherein, in the low-speed mode, acceleration is caused by input from the input device and occurs as the input is received; and
   in the low-speed mode, braking is caused by a lack of the input from the input device and occurs as the input is not received.

2. The computer of claim 1, wherein the instructions further include instructions to, in response to (1) a speed at which the vehicle is traveling being below a threshold and (2) one of the vehicle feature being active or the vehicle being in the preset geographic area, control acceleration and braking of the vehicle based on input from the input device according to the low-speed mode.

3. The computer of claim 1, wherein the input device includes an accelerator pedal.

4. The computer of claim 3, wherein the instructions further include instructions to, in response to the accelerator pedal being pressed by at least a preset amount, deactivate the low-speed mode.

5. The computer of claim 1, wherein the instructions further include instructions to, in response to the vehicle feature being active, control acceleration and braking of the vehicle based on input from the input device according to the low-speed mode.

6. The computer of claim 5, wherein the vehicle feature includes adaptive cruise control.

7. The computer of claim 5, wherein the vehicle feature includes automatic vehicle hold, and the instructions further include instructions to, in response to the automatic vehicle hold being active, brake the vehicle in response to a brake pedal of the vehicle being released while the vehicle is stopped and in gear.

8. The computer of claim 1, wherein the instructions further include instructions to, in response to the vehicle being in the preset geographic area, control acceleration and braking of the vehicle based on input from the input device according to the low-speed mode.

9. The computer of claim 8, wherein the preset geographic area includes areas designated in map data as parking areas.

10. The computer of claim 8, wherein the preset geographic area includes a user-inputted geographic area.

11. The computer of claim 8, wherein the instructions further include instructions to, in response to the vehicle being in the preset geographic area, control acceleration and braking of the vehicle to prevent the vehicle from exceeding a preset speed.

12. The computer of claim 1, wherein the instructions further include instructions to, in response to the low-speed mode being active and the vehicle being in the preset geographic area, control acceleration and braking of the vehicle based on input from the input device according to the low-speed mode.

13. The computer of claim 12, wherein the input device includes an alternative input device other than an accelerator pedal.

14. The computer of claim 1, wherein the input device includes an alternative input device other than an accelerator pedal.

15. The computer of claim 14, wherein the alternative input device includes a knob.

16. The computer of claim 14, wherein the alternative input device includes a button.

17. The computer of claim 14, wherein the alternative input device includes a paddle.

18. The computer of claim 14, wherein the instructions further include instructions to control acceleration and braking of the vehicle to travel a distance and then stop, the distance being a function of an input from the alternative input device.

19. The computer of claim 14, wherein an input from the alternative input device includes a direction of the input, and the instructions further include instructions to control acceleration and braking of the vehicle to travel forward in response to the direction of the input being a first direction and to travel in reverse in response to the direction of the input being a second direction.

20. A method comprising:
in response to one of a vehicle feature of a vehicle being active or the vehicle being in a preset geographic area, controlling acceleration and braking of the vehicle based on input from an input device of the vehicle according to a low-speed mode; and
in response to the low-speed mode being inactive, controlling acceleration and braking of the vehicle not according to the low-speed mode;
wherein, in the low-speed mode, acceleration is caused by input from the input device and occurs as the input is received; and
in the low-speed mode, braking is caused by a lack of the input from the input device and occurs as the input is not received.

* * * * *